United States Patent
Lang et al.

(10) Patent No.: US 7,334,134 B2
(45) Date of Patent: Feb. 19, 2008

(54) SYSTEM AND METHOD FOR PLAYBACK OF COPYING-AND-USE-PROTECTED ACOUSTIC AND IMAGE MEDIA

(76) Inventors: Juergen K. Lang, Schau ins Land 15, D-51429 Bergisch Gladbach (DE); Ursula Maria Bing, Schau ins Land 15, D-51429 Bergisch Gladbach (DE)

(*) Notice: Subject to any disclaimer, the term of this patent is extended or adjusted under 35 U.S.C. 154(b) by 674 days.

(21) Appl. No.: 10/495,384

(22) PCT Filed: Dec. 4, 2002

(86) PCT No.: PCT/DE02/04434
§ 371 (c)(1),
(2), (4) Date: May 11, 2004

(87) PCT Pub. No.: WO03/060907
PCT Pub. Date: Jul. 24, 2003

(65) Prior Publication Data
US 2005/0010791 A1    Jan. 13, 2005

(30) Foreign Application Priority Data
Dec. 30, 2001    (DE)    ............... 101 64 133

(51) Int. Cl.
*H04L 9/00*    (2006.01)
(52) U.S. Cl. ............. 713/193; 380/281; 380/282; 380/284; 380/285
(58) Field of Classification Search ............... 713/193; 380/281, 282, 284, 285
See application file for complete search history.

(56) References Cited

U.S. PATENT DOCUMENTS 6,697,945 B2 *    2/2004    Ishiguro et al. ............. 713/171

* cited by examiner

Primary Examiner—Kambiz Zand
Assistant Examiner—Yonas Bayou
(74) Attorney, Agent, or Firm—Andrew Wilford

(57) ABSTRACT

A playback unit decrypts data contents of electronic audio and video media that are supplied in entirely or partially encrypted or enciphered form by means of one or more "melody" keys for encrypting the data contents. This key is transmitted via a secure channel from an authentic source into the playback unit, and then the playback unit transfers these data contents from the digital domain into the analog domain in such a way that the data contents of the electronic audio and video media are not present at any time in unencrypted form as a digital data stream that can be copied.

11 Claims, 2 Drawing Sheets

Figure 1:
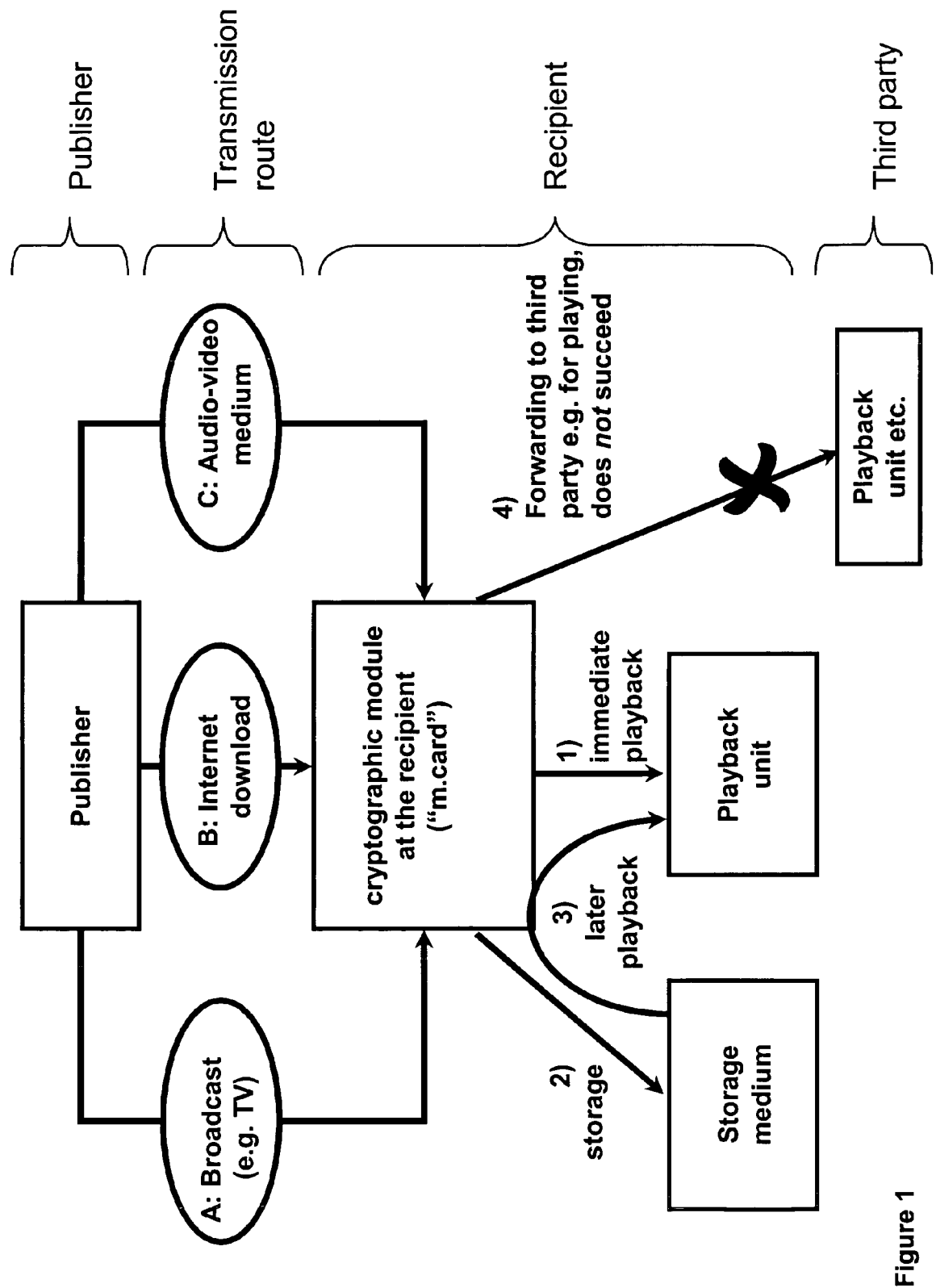

SYSTEM AND METHOD FOR PLAYBACK OF COPYING-AND-USE-PROTECTED ACOUSTIC AND IMAGE MEDIA

The invention relates to a system and to a method for playing copy-protected and utilization-protected electronic audio and video media and their data contents, whereby the data contents of the electronic media are encrypted in such a way they cannot be completely played or displayed without the execution of cryptographic processes.

It is known that so-called digital/analog transducers, D/A transducers for short, are used to play digital electronic media, for example, in order to convert a digital data stream that represents audio information into analog oscillations or signals that can be transmitted to a loudspeaker in an amplified form for purposes of conversion into acoustic (air) oscillations. The same applies to the conversion into analog video signals for display, for example, by means of a television tube.

The function of a D/A transducer is to convert the data stream that represents the audio and video information into analog signals as precisely and error-free as possible, while avoiding self-generated distortions. With a widespread modulation method, which has been in use since the early 1980s in the compact disc system, the so-called "Pulse-Code-Modulation", PCM for short, the digital data stream consists of discrete, absolutely quantified amplitude values that exist for every single so-called sampling point in time. In the present case of a compact disc, this means that, per channel, there are 44,100 amplitude values per second with a value range of 16 bits (value range from 0 to 65,535 or −32767 to +32767) in the data stream. According to the so-called sampling theorem of Nyquist, within the scope of the D/A conversion, these discrete values can be employed to reconstruct the course of the curve of the later analog signal theoretically error-free, as long as the highest frequency occurring in the analog signal is at the most half as much as the sampling frequency.

In spite of different models and modes of operation of D/A transducers, a characteristic feature of all of the transducers known so far is that digital data which represents an analog signal and from which algorithmic amplitude values can be calculated or generated within the scope of the conversion are fed in at the input of the D/A transducer.

All known playing devices for digital audio and video media in which D/A transducers are used share the problem that it is not possible to reliably prevent the production of illegitimate copies of the data stream and thus of the audio and video media (so-called "pirated copies"). At least immediately before the conversion, the digital data is present in a form that is referred to in cryptography circles as "plain text", and accordingly, can be used bit by bit and byte by byte to create exact copies and thus also unauthorized pirated copies. The playing of copy-protected and utilization-protected electronic audio and video media is currently not known.

The invention is based on the objective of further improving existing systems and methods for playing electronic audio and video media and the data contents of the electronic media so that the data contents of the electronic media are encrypted in such a manner that they cannot be completely played or displayed without the execution of cryptographic processes.

According to the invention, this objective is achieved in that, for playing purposes, a playback unit decrypts the data contents of electronic audio and video media that are supplied in entirely or partially encrypted or enciphered form by means of one or more "melody" keys for encrypting the data contents, said key being transmitted via a secure channel from an authentic source into the playback unit, and then said playback unit transfers these data contents from the digital domain into the analog domain in such a way that the data contents of the electronic audio and video media are not present at any point in time in unencrypted form as a digital data stream that can be copied.

An advantageous embodiment of the method and a preferred embodiment of the system are characterized in that the transmission of the "melody" key or keys via a secure channel is secured by means of cryptographic encryption or enciphering.

It is advantageous here that the encryption or enciphering for the secure transmission of the "melody" key or keys used for decrypting or deciphering the data contents is carried out by means of a "media" key that was received from a reliable, authentic source.

Moreover, it is advantageous here for the "media" key used for decrypting or deciphering the "melody" key used for decrypting or deciphering the data contents to be a "playback" key that is not used regularly for playing the appertaining data contents.

Furthermore, it is advantageous here for the exchange of the "playback" key between the authentic source and the playback unit to be secured by a certificate of a reliable certification authority that can be verified by the opposite party.

An advantageous embodiment of the method and a preferred embodiment of the system are also characterized in that the authentic source of the key is a cryptographic module that, after a decryption or deciphering of the electronic audio and video information stemming from the author, producer, processor or distributor or else their keys, once again encrypts or enciphers this information in such a way that only a playback unit can decrypt or decipher it.

Here it is advantageous for the "playback" key that is used in the cryptographic module subsequent to a re-encrypting process for encrypting or enciphering the electronic audio and video media or else the key for decrypting or deciphering the electronic audio and video media to be transferred in advance reliably and authentically from the cryptographic module to the playback unit.

Moreover, it is advantageous for the "playback" key that is used in the cryptographic module for encrypting or enciphering the "melody" key or keys to be generated in advance by the cryptographic module according to the random principle or according to algorithms that make them more difficult to predict.

It is also advantageous for the keys of the playback unit that are used in the cryptographic module for encrypting or enciphering the "playback" key for transmission to the playback unit to differ from one playback unit to the next.

Moreover, it is advantageous for the two data streams of the encrypted audio and video media on the one hand, and the "melody" key or keys that are to be decrypted with the decrypted "playback" key on the other hand, to only meet each other during the course of the actual digital-analog conversion so that a decrypted digital data stream of the audio and video data is not present.

Here, it is advantageous for the shift registers used for the digital-analog conversion to be constructed in such a way that, in order to convert their contents representing the audio and video signals, they need calibration information that is formed by the decrypted "melody" keys.

Additional advantages, special features and practical embodiments of the invention ensue from the subclaims and from the presentation below of preferred embodiments.

The present method and system is to be introduced by several companies in the media industry under the project designation "m.sec". Below, the special features of m.sec are described.

With the advent of methods and systems for digital audio and video storage, a new level of sound media piracy arose: through so-called "sampling", the audio and video signals, which had previously existed only in analog form, were unambiguously quantified within the scope of digitalization. Thanks to this unambiguous quantification, for example, in the form of bits and bytes with unambiguous values, perfect copies could be produced for the first time which could no longer be distinguished from the original and which thus suffered no qualitative degradation.

After sound media piracy had already acquired a substantial scope in the form of illegally produced CD copies with the spread of the compact disc, this piracy intensified even further with the advent of the Internet. Due to the large data volume, this was not so much a case of CD copies or audio files in the CD format but rather, sound media piracy was facilitated by a new data format, with which—due to its great compressability—small files could be created that could easily be exchanged via the Internet: the so-called "MP3" format.

MP3 was particularly promoted by the Internet swap network "Napster" which—partially on the edge of legality and partially outside of the law—offered allegedly private exchange transactions between Internet users in a public framework, thereby fostering the illegal transmission of music titles to third parties.

At the latest since MP3 and Napster, the media industry has felt that there is a greater need for a new data format for audio and video data. M.sec meets this need by offering the following advantages:

Digital audio and video data is no longer published unencrypted so that no perfect pirated copies of this original data can be produced.

The audio and video data at the recipient is only decrypted in exchange for payment of a user fee.

Here, variable user fees can be charged.

It is also possible to play parts of the audio and video data (e.g. the first few seconds of a piece of music or the lead of a film) without payment of a user fee.

It is possible to play any parts of the audio and video data without payment of a user fee but with a diminished quality.

The encrypted audio and video data can be provided with certain utilization rights (e.g. the number of times it can be played and copied) as well as other additional information.

When the audio and video data are played, the data is likewise not transferred unencrypted. Decryption only takes place at the time of the so-called digital-analog conversion (D/A conversion).

With the appropriate utilization rights, the recipient can create copies of the audio and video data after payment of a user fee.

These personal copies of the audio and video data are "released" and from then on can be played without further payment of license fees.

Such copies of the audio and video data that the recipient has created after payment of a user fee cannot be readily used by other recipients.

In order to meet these requirements, m.sec comprises the following architecture:

The so-called "publisher" distributes electronic audio and video data that is entirely or partially encrypted. (see "publisher" in FIG. 1)

The recipient has an individual, personalized chip card (the so-called m.card) which, as a cryptographic module, provides functionalities that the recipient cannot manipulate (see "cryptographic module at the recipient, m.card" in FIG. 1)

Appropriate playback and display devices (e.g. personal computer, CD player, Walkman, TV, etc.), in conjunction with the insertable chip card (m.card), offer the possibility to correctly play encrypted audio and video data.

FIG. 1 shows the three possible transmission routes, designated as A, B and C:

With transmission route A (e.g. television), there is a continuous and direct reception of the audio and video data, in the extreme case, in an uninterrupted data stream without beginning or end (so-called "streaming").

With transmission route B, there is a remote transmission of audio and video media (e.g. as an Internet download) as a rule, in the form of dedicated, complete files.

With transmission route C, the audio and video information is available at the recipient on physically provided audio and video media (e.g. CDs or DVDs).

Here, the following scenarios of use are provided:

1. Playback of transmitted audio and video media (e.g. broadcast TV program)

If completely or partially encrypted contents of audio and video media are to be received and played immediately, then the m.card serves as the re-encrypting instrument between the encryption by the publisher and the playback unit.

Here, the encryption by the publisher in the m.card is reversed by means of decryption, the right to play is checked and the playback is initiated. As a rule, this re-encrypting is associated with costs that can be administered, for example, in the cryptographic module. In FIG. 1, this corresponds to the transmission route A in conjunction with the measure at the recipient designated by the number 1), namely, immediate playback.

2. Download and personal release of audio and video data for subsequent playback If completely or partially encrypted contents are to be loaded, for example, downloaded from the Internet and released for later personal use, then the m.card serves as a re-encrypting instrument between the encryption by the publisher and the personal encryption with the m.card. As a rule, this re-encrypting is associated with costs that can be administered, for example, in the cryptographic module. In FIG. 1, this corresponds to the transmission route B in conjunction with the measure at the recipient designated by the number 2), namely, the local storing of the information.

Here, the encryption by the publisher in the m.card is reversed by means of decryption, the right to create a local copy is checked, the encryption with the m.card's own key is carried out and the generation of a copy is initiated.

3. Playback of audio and video data that has been provided by the author on physical media If completely or partially encrypted contents of audio and video media are to be played which are provided on physical media, then the m.card serves as a re-encrypting instrument between the encryption by the publisher and the playback unit.

Here, the encryption by the publisher in the m.card is reversed by means of decryption, the right to play is checked and the playback is initiated. As a rule, this re-encrypting is associated with costs that can be administered, for example, in the cryptographic module. In FIG. 1, this corresponds to the transmission route C in conjunction with the measure at the recipient designated by the number 1), namely, immediate playback.

If the audio and video information is not temporarily stored in the re-encrypted state as shown in Item 2 in FIG. 1, then, for purposes of repeated playback of the data that has not been re-encrypted, the information can be securely saved by means of the first-time decryption of precisely specified audio and video data either in the cryptographic module itself or else outside of the cryptographic module, provided with a digital signature of the cryptographic module.

4. First and repeated playback of personally released audio and video data

If contents of audio and video media that have been released and encrypted again with the m.card's own key are to be played back, then the m.card serves as the re-encrypting instrument. As a rule, this re-encrypting is free of charge since a one-time fee for the release was already charged at the time of the original storing operation. In FIG. 1, this corresponds to the measure at the recipient designated by the number 3), namely, later playback.

Here, the actual encryption of the m.card is reversed in the m.card by means of decryption and the playback is initiated.

5. Forwarding personally released audio and video data to (Unauthorized) third parties If contents of audio and video media that have been released and encrypted again with the m.card's own key are forwarded to third parties, then the latter does not have the possibility to decrypt them, so that the production of pirated copies is not possible. In FIG. 1, this corresponds to the measure at the recipient designated by the number 4), namely, forwarding to third parties.

Forwarding to Third Parties (Optional) of Released Audio and Video Data that can be Made Public Again If contents of audio and video media (e.g. for a separate fee) are released so that they can be made public again and if they are encrypted again with the m.card's own key, then forwarding to third parties is possible. For third parties, however, the possibility of decryption then exists (e.g. for a fee), in the same manner as this is possible for audio and video data that comes directly from publishers.

Use of Keys in the Entire System

Figure 2:
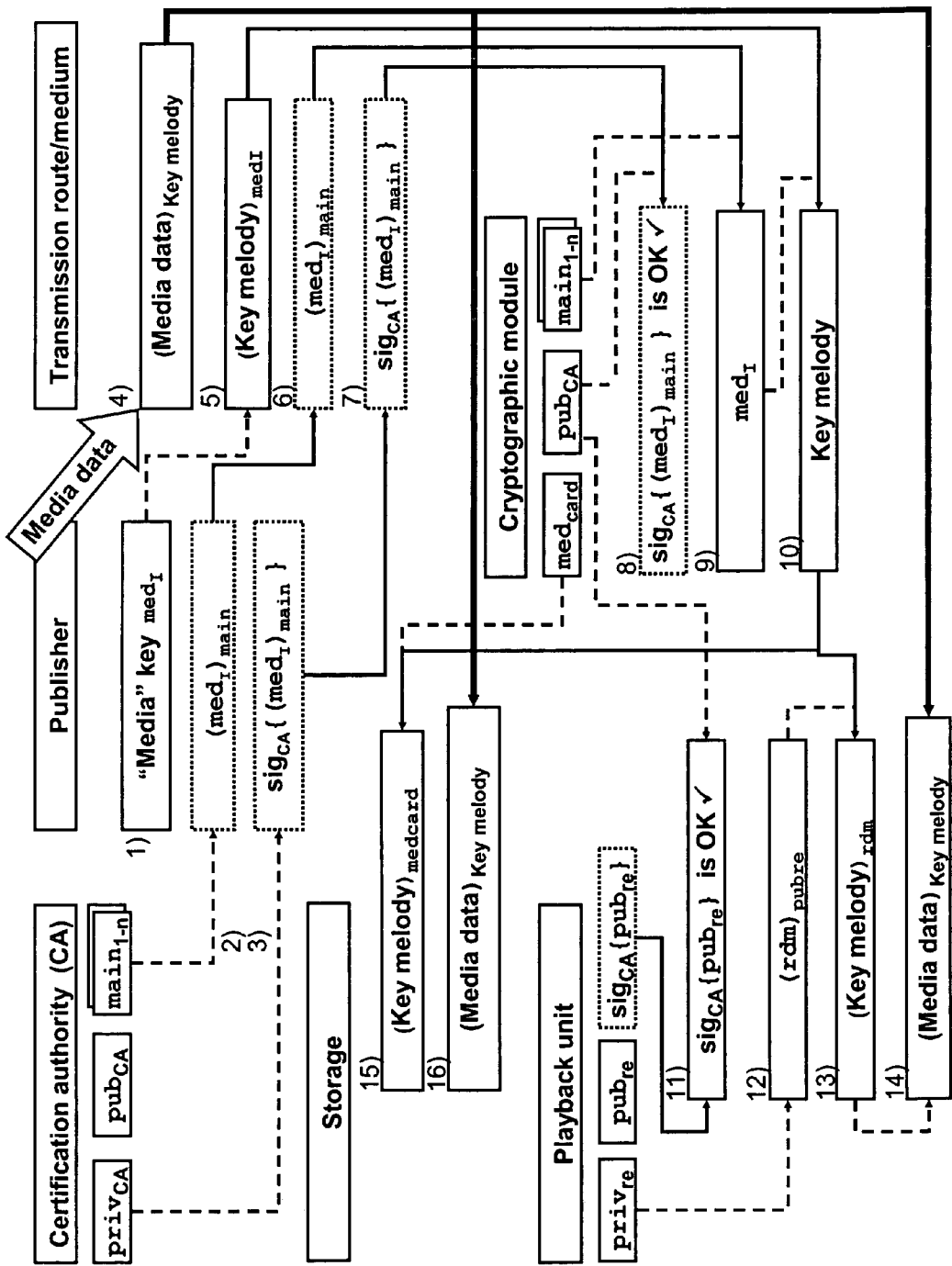

FIG. 2 illustrates the use of keys in the entire system. In addition to the already mentioned participating parties or system components (publisher, transmission channel/medium, cryptographic module m.card, storage and playback unit), there is now a new party, namely, the certification authority (CA) which, as a neutral, trustworthy body or "trust center", vouches for the issuing of keys.

The Following Keys are Used by the Parties:

The certification authority has a so-called first "main" key $main_1$. Encryptions with this first "main" key can be decrypted with the counterpart to this "main" key, which is present in every m.card. The "main" key is, for example, a symmetrical key according to TDES with a key length of at least 168 bits. As an alternative, keys according to other encryption methods and with other key lengths, e.g. asymmetrical keys with a length of 1024 bits, can also be used, whereby in the case of asymmetrical methods, for example, the private keys are kept in the certification authority and the public key is kept at the cryptographic modules m.cards. In order to enhance the security, when asymmetrical keys are used, the "public" key component in the cryptographic module m.card is not actually made public but rather, in a likewise secure manner, it is introduced into the cryptographic module and would not be ascertainable by the recipient. For security reasons, the "main" key is at least duplicated so that, if need be, the possibility exists in the certification authority as well as in the m.cards to turn to a second or even to additional "main" keys $main_2$, $main_n$. In order to simplify the description below, regardless of whether symmetrical or asymmetrical keys are used as the "main" key, the symmetrical variant is presented and explained. With the asymmetrical variant, the key $main_1$, at the certification authority would correspond to the private key and the key $main_1$, in the cryptographic module would correspond to the matching public key.

In order to encrypt their audio and video media, the individual publishers receive a new "media" key $med_I$ from the certification authority, for example, every year (see Step 1 in FIG. 2). This generally symmetrical key indirectly encrypts the data contents, namely, via changing "melody" keys, which is subsequently referred to as the "key melody", (see further below for explanation). Other encryption methods (e.g. asymmetrical or on the basis of elliptical curves) are also possible. Since the key $med_I$ is not available for decryption in the m.card, said key is supplied together with the data contents of the audio and video media, in once again encrypted form. The publisher "media" key is encrypted at the certification authority with the "main" key $main_1$. The publisher "media" key $(med_I)_{main}$, which is encrypted with the "main" key, is also digitally signed by the certification authority $sig_{CA}\{(med_I)_{main}\}$. In this process, the certification authority creates a so-called digital fingerprint of the encrypted publisher "media" key and this digital fingerprint is then encrypted with the private signing key of the certification authority $priv_{CA}$ (see Steps 2 and 3 in FIG. 2).

In order to prevent the publisher from calculating the "main" key by means of crypto-analysis or by trying out all possible key combinations, through the presence of the pair consisting of the "media" key and the "media" key that was encrypted with the top-secret "main" key, the publisher only has access to the "media" key in a cryptographic module in such a way that the latter cannot read out the "media" key but can only use it in accordance with the application purpose.

This signature of the certification authority is checked later in the cryptographic module m.card by the self-certificate of the certification authority that is saved there and that contains the public counterpart $pub_{CA}$ of the signing key of the certification authority as well as, in turn, its signature with the signing key. As an alternative, especially if there is a lack of storage capacity in the cryptographic module, it is also possible for only the public key of the certification authority to be saved there. Likewise, in case of a lack of storage capacity, a summary of the two key components, $main_1$, and $pub_{CA}/priv_{CA}$, which are present in the certification authority and in the cryptographic module, is possible, although this lowers the security level.

Data contents are now encrypted by the publisher with so-called "melody" keys that change in a time sequence (for instance, every minute or second), and that subsequently form the so-called "key melody". Advantageously, these changing "melody" keys are random keys according to any desired, for example, symmetrical, method such as TDES with 128 bits. As an alternative, other keys can also be used as random keys (see Step 4 in FIG. 2).

In order to permit the later decryption of the data contents encrypted with the key melody, the key melody is encrypted with the "media" key of the publisher $med_I$ and, together with the encrypted audio and video information, transmitted to the recipient via the transmission channel or medium (see Step 5 in FIG. 2). The key melody encrypted with the "media" key is called the "crypto-melody".

The "media" key $(med_I)_{main}$ originally provided to the publisher by the certification authority (see Step 6 in FIG. 2) as well as the certificate or digital signature of the encrypted "media" key $sig_{CA}\{(med_I)_{main}\}$, likewise provided by the certification authority, are also transmitted to the recipient (see Step 7 in FIG. 2).

Thus, to summarize, at least the following four pieces of information are transferred to the recipient via the transmission channel or via the medium, together with the actual audio and video information (additional information can contain authorizations and utilization information such as, for instance, prices):

Media data encrypted with the key melody: $(\text{media data})_{key\ melody}$

The key melody encrypted with the "media" key: $(\text{key melody})_{med_I}$

The "media" key encrypted with the "main" key: $(med_I)_{main}$

The certificate of the "media" key or the digital signature of the "media" key created by the certification authority: $sig_{CA}\{(med_I)_{main}\}$ Prior to the decryption of the data contents, the "media" key $med_I$ is ascertained in the m.card. Since this key is still in encrypted and signed form together with the audio and video media, first of all, the certificate or the signature of the certification authority is checked with the public key of the certification authority $pub_{CA}$ that is present in the m.card (see Step 8 in FIG. 2). Subsequently, the "media" key is decrypted with the "main" key $main_1$ that is present in the m.card and then used for the decryption operation (see Step 9 in FIG. 2).

Regardless of whether the audio and video media are to be played immediately or else stored temporarily, the crypto-melody is now decrypted into the key melody, making use of the previously decrypted "media" key (see Step 10 in FIG. 2).

This is where the advantage of using changing melody keys that make up the key melody now becomes evident. During the course of processing the data stream of the audio and video data, taking into account the computing capacity of the cryptographic module, only one media key at a time has to be processed in this module, and said key is valid for a specific period of time. Even if one single melody key were to be made public, for example, by crypto-analysis or trial and error, this would only have consequences for a short sequence of audio and video data that would then no longer be protected.

Like the "media" key, the key melody must not be read out. This is ensured through the use of the cryptographic module.

If the audio and video media are to be played immediately, then first of all, the certificate $sig_{CA}\{pub_{re}\}$ issued by the certification authority for the playback unit (or for that model of the playback unit) is transferred from the playback unit to the cryptographic module where it is checked using the saved public key of the certification authority $pub_{CA}$ (see Step 11 in FIG. 2). For practical reasons, as a rule, the asymmetrical keys of the playback unit $pub_{re}$ and $priv_{re}$ are not individually different pairs of keys but rather keys that are changed with each new model of the playback unit and that are identical within each model.

After positive verification, a random or unpredictable temporary playback key rdm is generated in the cryptographic module, then encrypted with the public key of the playback unit $(rdm)_{pubre}$ taken from the previously verified certificate and transferred to the playback unit (see Step 12 in FIG. 2).

Subsequently, in the cryptographic module, the key melody is encrypted with the playback key rdm (see Step 13 in FIG. 2) and, together with the media data that are still encrypted, transferred to the playback unit (see Step 14 in FIG. 2). The playback key thus takes over the function of a temporary "media" key. "Intercepting" the data exchanged between the cryptographic module and the playback unit cannot be used for unauthorized pirated copies since the encrypted key melody cannot be decrypted.

The playback key, with which the key melody can be decrypted and with which finally the media data can be decrypted for final playback, is decrypted in the playback unit.

If the audio and video media are not going to be played immediately but rather first temporarily stored as a local copy, then, after an appropriate verification of the utilization rights, the unencrypted key melody that is present in the crypto-graphic module is encrypted with a "card" key $med_{card}$ that is individually associated with the cryptographic module and securely saved there (see Step 15 in FIG. 2). The key melody that is thus once again encrypted to form a card-specific crypto-melody is stored, together with the media data that are still encrypted, on any desired data medium, e.g. on the hard drive of a PC (see Step 16 in FIG. 2).

This card key functions like a publisher "media" key but as a rule, in contrast to the latter, it does not accompany the audio and video media for security reasons.

In an optional alternative, special card keys as well as the publisher "media" key, can accompany the audio and video media in encrypted form. The card key, like with the publisher "media" key, is encrypted with another "main" key that is present in every key. By the same token, it is advantageous with this alternative to add the encrypted card key to the audio and video media, together with a signature of a certification authority. Through this alternative, the audio and video media encrypted with a card can be played via another card. In this manner, audio and video media can become "re-publishable", optionally for a fee.

The use of main, media and signing keys reduces the overall risk of corruption of the entire system: by using relatively few "media" keys (e.g. one per publisher per year), the sensitive "main" key is used as little as possible, as a result of which the discovery of the key within the scope of crypto-analysis is made more difficult. However, even in the actually serious event that the "main" key (which is, of course, present in every m.card) is discovered, this does not lead to a failure of the entire system since for this to happen, it would likewise be necessary to discover the well-secured signing key of the certification authority. Only through the interaction of the "main" key, the "media" key and the signing key is a simple and secure copy and utilization protection ensured.

Practical Use of Playback Units

Playback units that comply with the m.sec method can be realized as integrated circuits and used as a replacement for or as an alternative to existing digital-analog converters such as, for example, in television sets, radios, CD players, DVD players, video recorders, video cameras, projection systems, PC sound cards and PC graphic cards.

In order to allow communication with the personal crypto-graphic module m.card, it is advantageous if the above-mentioned devices provide an appropriate communication interface. There are two alternatives here; either local communication or network-based communication to remote systems (e.g. in the Internet).

The alternative preferred for the realization is local communication to the cryptographic module that is configured as a microprocessor chip card or as a dongle. The installation of a chip card reader in or on the playback device or else a plug for inserting the dongle is likewise advantageous.

The invention claimed is:

1. A method configured for playing copy-protected and utilization-protected electronic audio and video media and their data contents, whereby the data contents of the electronic media are encrypted in such a way they cannot be completely played or displayed without the execution of cryptographic processes, wherein for playing purposes, a playback unit decrypts the data contents of electronic audio and video media that are supplied in entirely or partially encrypted or enciphered form by means of one or more "melody" keys for encrypting the data contents, the key being transmitted via a secure channel from an authentic source into the playback unit, and then the playback unit transfers these data contents from the digital domain into the analog domain in such a way that the data contents of the electronic audio and video media are not present at any point in time in unencrypted form as a digital data stream that can be copied, at least the following four pieces of information are transferred to a recipient via a transmission channel or via a medium together with actual audio and video information:

1) media data encrypted with the key melody: (media data)$_{key\ melody}$,
2) the key melody encrypted with the "media" key: (key melody)$_{medI}$,
3) the "media" key encrypted with the "main" key: (med$_r$)$_{man}$, and
4) the certificate of the "media" key or the digital signature of the "media" key created by the certification authority: sig$_{CA}${(med$_r$)$_{main}$}.

2. The method according to claim 1 wherein the transmission of the "melody" key or keys via a secure channel is secured by means of cryptographic encryption or enciphering.

3. The method according to claim 1 wherein the encryption or enciphering for the secure transmission of the "melody" key or keys used for decrypting or deciphering the data contents is carried out by means of a "media" key that was received from a reliable, authentic source.

4. The method according to claim 1 wherein the "media" key used for decrypting or deciphering the "melody" key used for decrypting or deciphering the data contents is a "playback" key that is not used regularly for playing the appertaining data contents.

5. The method according to claim 1 wherein the exchange of the "playback" key between the authentic source and the playback unit is secured by a certificate of a reliable certification authority that can be verified by the opposite party.

6. The method according to claim 1 wherein the authentic source of the key is a cryptographic module that, after a decryption or deciphering of the electronic audio and video information stemming from the author, producer, processor or distributor or else their keys, once again encrypts or enciphers this information in such a way that only a playback unit can decrypt or decipher it.

7. The method according to claim 1 wherein the "playback" key that is used in the cryptographic module subsequent to a re-encrypting process for encrypting or enciphering the electronic audio and video media or else the key for decrypting or deciphering the electronic audio and video media is transferred in advance reliably and authentically from the cryptographic module to the playback unit.

8. The method according to claim 1 wherein the "playback" key that is used in the cryptographic module for encrypting or enciphering the "melody" key or keys is generated in advance by the cryptographic module according to the random principle or according to algorithms that make them more difficult to predict.

9. The method according to claim 1 wherein the keys of the playback unit that are used in the cryptographic module for encrypting or enciphering the "playback" key for transmission to the playback unit differ from one playback unit to the next.

10. The method according to claim 1 wherein the two data streams of the encrypted audio and video media on the one hand, and the "melody" key or keys that are to be decrypted with the decrypted "playback" key on the other hand, only meet each other during the course of the actual digital-analog conversion so that a decrypted digital data stream of the audio and video data is not present.

11. The method according to claim 1 wherein the shift registers used for the digital-analog conversion are constructed in such a way that, in order to convert their contents representing the audio and video signals, they need calibration information that is formed by the decrypted "melody" keys.

* * * * *